(12) United States Patent
Okita

(10) Patent No.: US 8,170,338 B2
(45) Date of Patent: May 1, 2012

(54) INFORMATION PROCESSING APPARATUS AND METHOD FOR CORRECTING ELECTRONIC INFORMATION OBTAINED FROM HANDWRITTEN INFORMATION

(75) Inventor: Kunio Okita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1057 days.

(21) Appl. No.: 12/099,807

(22) Filed: Apr. 9, 2008

(65) Prior Publication Data
US 2008/0292191 A1 Nov. 27, 2008

(30) Foreign Application Priority Data
May 23, 2007 (JP) ................................ 2007-137222

(51) Int. Cl.
- G06K 9/34 (2006.01)
- G06K 9/18 (2006.01)
- G06K 9/54 (2006.01)
- G06F 17/00 (2006.01)

(52) U.S. Cl. ........ 382/179; 382/182; 382/306; 715/248; 715/232

(58) Field of Classification Search .................. 382/182, 382/179, 306; 715/248, 232
See application file for complete search history.

(56) References Cited

U.S. PATENT DOCUMENTS

| | | | |
|---|---|---|---|
| 4,899,137 A * | 2/1990 | Behrens et al. | 345/168 |
| 5,138,465 A | 8/1992 | Ng et al. | |
| 5,257,074 A * | 10/1993 | Kamei | 382/187 |
| 5,438,430 A | 8/1995 | Mackinlay et al. | |
| 5,459,796 A * | 10/1995 | Boyer | 382/187 |
| 5,721,940 A * | 2/1998 | Luther et al. | 715/200 |
| 5,897,648 A * | 4/1999 | Henderson | 715/210 |
| 5,923,792 A * | 7/1999 | Shyu et al. | 382/309 |
| 5,970,170 A * | 10/1999 | Kadashevich et al. | 382/187 |
| 6,396,598 B1 * | 5/2002 | Kashiwagi et al. | 358/474 |
| 6,950,553 B1 * | 9/2005 | Deere | 382/218 |
| 6,989,822 B2 * | 1/2006 | Pettiross et al. | 345/179 |
| 7,068,810 B2 * | 6/2006 | Keating et al. | 382/100 |
| 7,142,733 B1 * | 11/2006 | Nakagawa | 382/310 |
| 7,277,584 B2 * | 10/2007 | Nakanishi et al. | 382/218 |
| 7,305,129 B2 * | 12/2007 | Chellapilla et al. | 382/174 |
| 7,551,778 B2 * | 6/2009 | Miyatake et al. | 382/180 |
| 7,702,624 B2 * | 4/2010 | King et al. | 707/999.004 |
| 2003/0026481 A1 * | 2/2003 | Keskar et al. | 382/187 |
| 2004/0085301 A1 * | 5/2004 | Furukawa et al. | 345/179 |

(Continued)

FOREIGN PATENT DOCUMENTS
JP 2002-170077 6/2002
(Continued)

*Primary Examiner* — Kathleen Y Dulaney
(74) *Attorney, Agent, or Firm* — Oblon, Spivak, McClelland, Maier & Neustadt, L.L.P.

(57) ABSTRACT

A disclosed information processing apparatus includes an image data obtaining unit configured to obtain image data generated by scanning a confirmation/correction form on a recording medium; a workflow definition obtaining unit configured to obtain a workflow definition of a workflow that includes a workflow step corresponding to the recording medium; a form definition obtaining unit configured to obtain a form definition of the confirmation/correction form corresponding to the workflow step based on the workflow definition; a field image extracting unit configured to extract a field image of a field of the confirmation/correction form from the image data based on the form definition; and a handwriting image extracting unit configured to remove a previous handwriting image and extract a current handwriting image from the field image if the field image contains both the previous handwriting image and the current handwriting image.

10 Claims, 12 Drawing Sheets

(a) ORIGINAL IMAGE (b) CONFIRMATION/CORRECTION FORM (c) CORRECTION INFORMATION (d) CORRECTED IMAGE

U.S. PATENT DOCUMENTS

| | | | |
|---|---|---|---|
| 2004/0196313 A1* | 10/2004 | Wynn et al. | 345/779 |
| 2005/0281450 A1* | 12/2005 | Richardson | 382/139 |
| 2006/0007189 A1* | 1/2006 | Gaines et al. | 345/179 |
| 2006/0050969 A1* | 3/2006 | Shilman et al. | 382/224 |
| 2006/0159345 A1* | 7/2006 | Clary et al. | 382/186 |
| 2006/0165295 A1* | 7/2006 | Matsueda | 382/224 |
| 2006/0221064 A1* | 10/2006 | Sawada | 345/173 |
| 2007/0020009 A1 | 1/2007 | Fukuda | |
| 2007/0091393 A1* | 4/2007 | Matsumoto | 358/538 |
| 2007/0168382 A1* | 7/2007 | Tillberg et al. | 707/102 |
| 2007/0195370 A1* | 8/2007 | Suga et al. | 358/1.18 |
| 2007/0291017 A1* | 12/2007 | Syeda-Mahmood et al. | 345/179 |
| 2008/0104508 A1* | 5/2008 | Lumley et al. | 715/255 |
| 2008/0114782 A1* | 5/2008 | Sadovsky et al. | 707/100 |
| 2008/0144881 A1* | 6/2008 | Fortune et al. | 382/100 |
| 2008/0181501 A1* | 7/2008 | Faraboschi et al. | 382/179 |
| 2008/0195965 A1* | 8/2008 | Pomerantz | 715/780 |
| 2008/0228734 A1* | 9/2008 | Kang | 707/3 |

FOREIGN PATENT DOCUMENTS

JP     2004-303135     10/2004

* cited by examiner

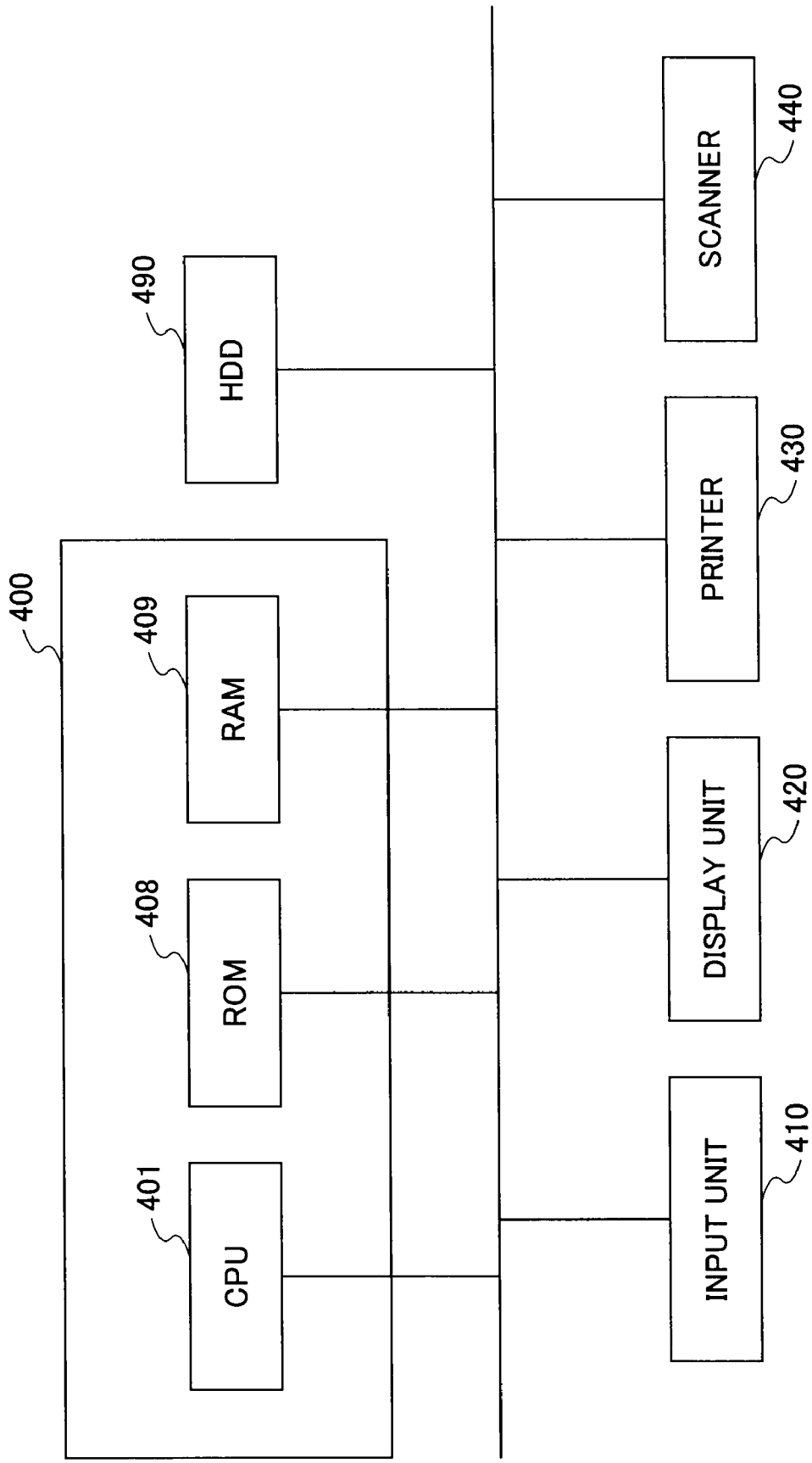

INFORMATION PROCESSING APPARATUS AND METHOD FOR CORRECTING ELECTRONIC INFORMATION OBTAINED FROM HANDWRITTEN INFORMATION

BACKGROUND OF THE INVENTION

1. Field of the Invention

The present invention generally relates to an information processing apparatus and an information processing method.

2. Description of the Related Art

There are information processing apparatuses that can scan and process handwritten information on a form. Such an information processing apparatus allows the user to convert handwritten information on a form into electronic information without using an input device such as a keyboard. Normally, such an information processing apparatus includes a function to update the electronic information based on correction information to correct an error in the handwritten information.

Patent document 1 discloses a correction processing server that manages data entered in individual areas of a form using an electronic pen in association with time information. If a correction indicator is found in the entered data, the disclosed correction processing server replaces the data (data to be corrected) in the corresponding area with newly entered data.

Patent document 2 discloses a character reader that recognizes characters written on a ledger sheet. If rewritten characters are found above or below the original characters, the disclosed character reader selects the rewritten characters and discards the original characters.

[Patent document 1] Japanese Patent Application Publication No. 2004-303135

[Patent document 2] Japanese Patent Application Publication No. 2002-170077

Although the technologies disclosed in patent documents 1 and 2 make it possible to correct electronic information obtained from handwritten information, those technologies have some disadvantages. For example, the technology disclosed in patent document 1 requires a dedicated input device such as an electronic pen. Also, the technology disclosed in patent document 2 requires extra space in a form to write corrections above or below original characters and therefore limits the flexibility in form design.

SUMMARY OF THE INVENTION

Embodiments of the present invention provide an information processing apparatus and an information processing method that solve or reduce one or more problems caused by the limitations and disadvantages of the related art.

An embodiment of the present invention provides an information processing apparatus that includes an image data obtaining unit configured to obtain image data generated by scanning a confirmation/correction form on a recording medium; a workflow definition obtaining unit configured to obtain a workflow definition of a workflow that includes a workflow step corresponding to the recording medium; a form definition obtaining unit configured to obtain a form definition of the confirmation/correction form corresponding to the workflow step based on the workflow definition; a field image extracting unit configured to extract a field image of a field of the confirmation/correction form from the image data based on the form definition; and a handwriting image extracting unit configured to remove a previous handwriting image and extract a current handwriting image from the field image if the field image contains both the previous handwriting image and the current handwriting image, and to extract the current handwriting image from the field image if the field image contains only the current handwriting image.

Another embodiment of the present invention provides an information processing method including the steps of a) obtaining image data generated by scanning a confirmation/correction form on a recording medium; b) obtaining a workflow definition of a workflow that includes a workflow step corresponding to the recording medium; c) obtaining a form definition of the confirmation/correction form corresponding to the workflow step based on the workflow definition; d) extracting a field image of a field of the confirmation/correction form from the image data based on the form definition; and e) removing a previous handwriting image and extracting a current handwriting image from the field image if the field image contains both the previous handwriting image and the current handwriting image, or extracting the current handwriting image from the field image if the field image contains only the current handwriting image.

BRIEF DESCRIPTION OF THE DRAWINGS

FIG. 12 is a block diagram illustrating a configuration of a computer for implementing an information processing apparatus according to an embodiment of the present invention.

DESCRIPTION OF THE PREFERRED EMBODIMENTS

Preferred embodiments of the present invention are described below with reference to the accompanying drawings.

<Usage of Information Processing Apparatus>

Figure 1:
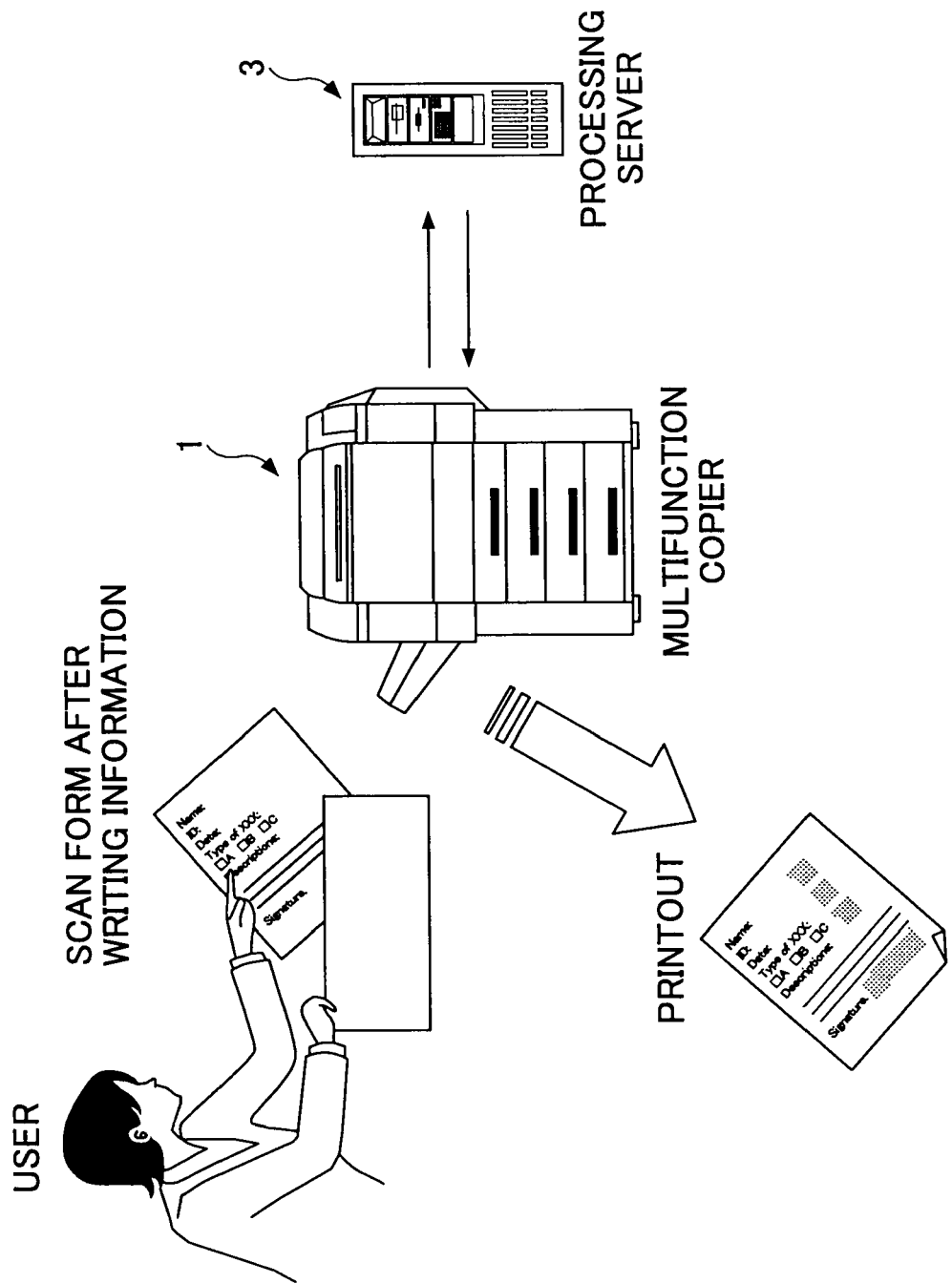
FIG. 1 is a drawing illustrating usage of a multifunction copier 1 as an example of an information processing apparatus according to an embodiment of the present invention.

FIG. 1 is a drawing illustrating usage of a multifunction copier 1 as an example of an information processing apparatus according to an embodiment of the present invention. As shown in FIG. 1, the user writes information on a form by hand and scans the form with the multifunction copier 1. The multifunction copier 1 processes image data obtained by scanning the form and prints the processed image data. The printout includes a handwriting image (image of the information handwritten by the user) or handwriting information obtained by analyzing the handwriting image.

Alternatively, the multifunction copier 1 may be configured to send the image data to a processing server 3 connected, for example, via a network and to request the processing server 3 to process the image data. Also, the multifunction copier 1 may be configured to receive image data from the processing server 3 and to process the received image data.

<Handwriting Image Correction Process>

Figure 2:
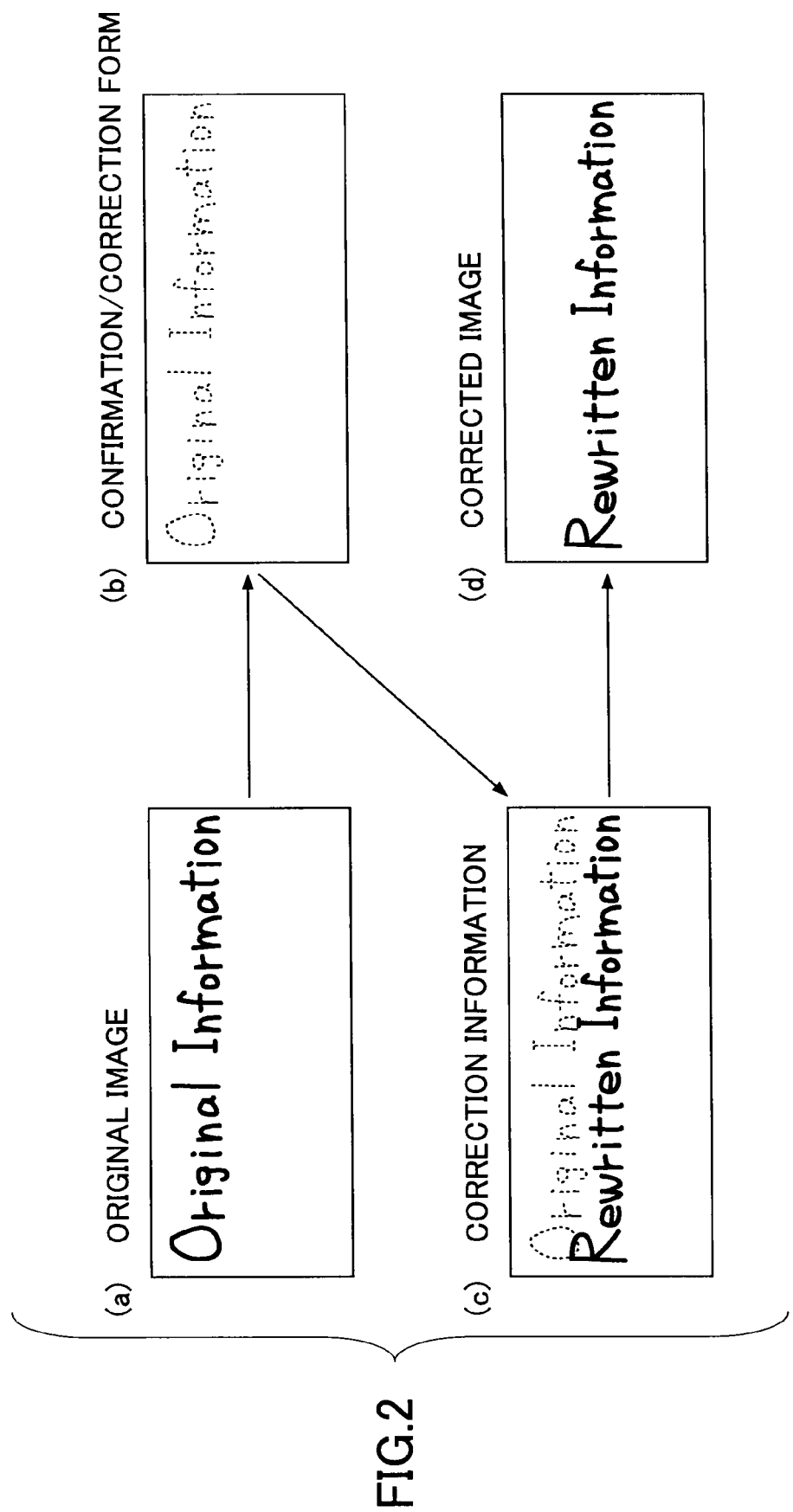
FIG. 2 is a drawing illustrating an exemplary handwriting image correction process.

FIG. 2 is a drawing illustrating an exemplary handwriting image correction process. FIG. 2(*a*) shows characters "Original Information" handwritten by the user in a field on a form. FIG. 2(*b*) shows an image "Original Information" obtained by scanning and processing the handwritten characters "Original Information" shown in FIG. 2(*a*) by the multifunction copier 1. The color of the obtained image "Original Information" is changed from that shown in FIG. 2(*a*).

To change (or correct) the characters "Original Information" to "Rewritten Information", the user writes correction information "Rewritten Information" as shown in FIG. 2(*c*) on a new form on which the image "Original Information" shown in FIG. 2(*b*) is printed. FIG. 2(*d*) shows the corrected image "Rewritten Information". The multifunction copier 1 scans the new form, removes the image "Original Information", and retains the image "Rewritten Information".

In the present application, a form having a previous handwriting image printed in a predetermined color (hereafter called a previous-image color) in the corresponding field of the form is called a confirmation/correction form. Also, a previous handwriting image drawn in the previous-image color is called confirmation information.

With the confirmation/correction form, the user can confirm a previous handwriting image. Also, the user can correct a previous handwriting image by writing correction information on the confirmation/correction form. An information processing apparatus according to an embodiment of the present invention scans the confirmation/correction form and replaces the previous handwriting image with the correction information (or a current handwriting image).

In the example shown in FIG. 2(*b*), scanned handwritten characters are superposed on the confirmation/correction form as a handwriting image. Alternatively, an information processing apparatus of an embodiment of the present invention may be configured to analyze the handwriting image to convert the handwriting image into corresponding characters or symbols (handwriting information), to generate a previous handwriting image (confirmation information) by rendering the characters or symbols and changing their colors to the previous-image color, and to superpose the generated previous handwriting image on the confirmation/correction form.

<First Exemplary Configuration of Information Processing Apparatus>

Figure 3:
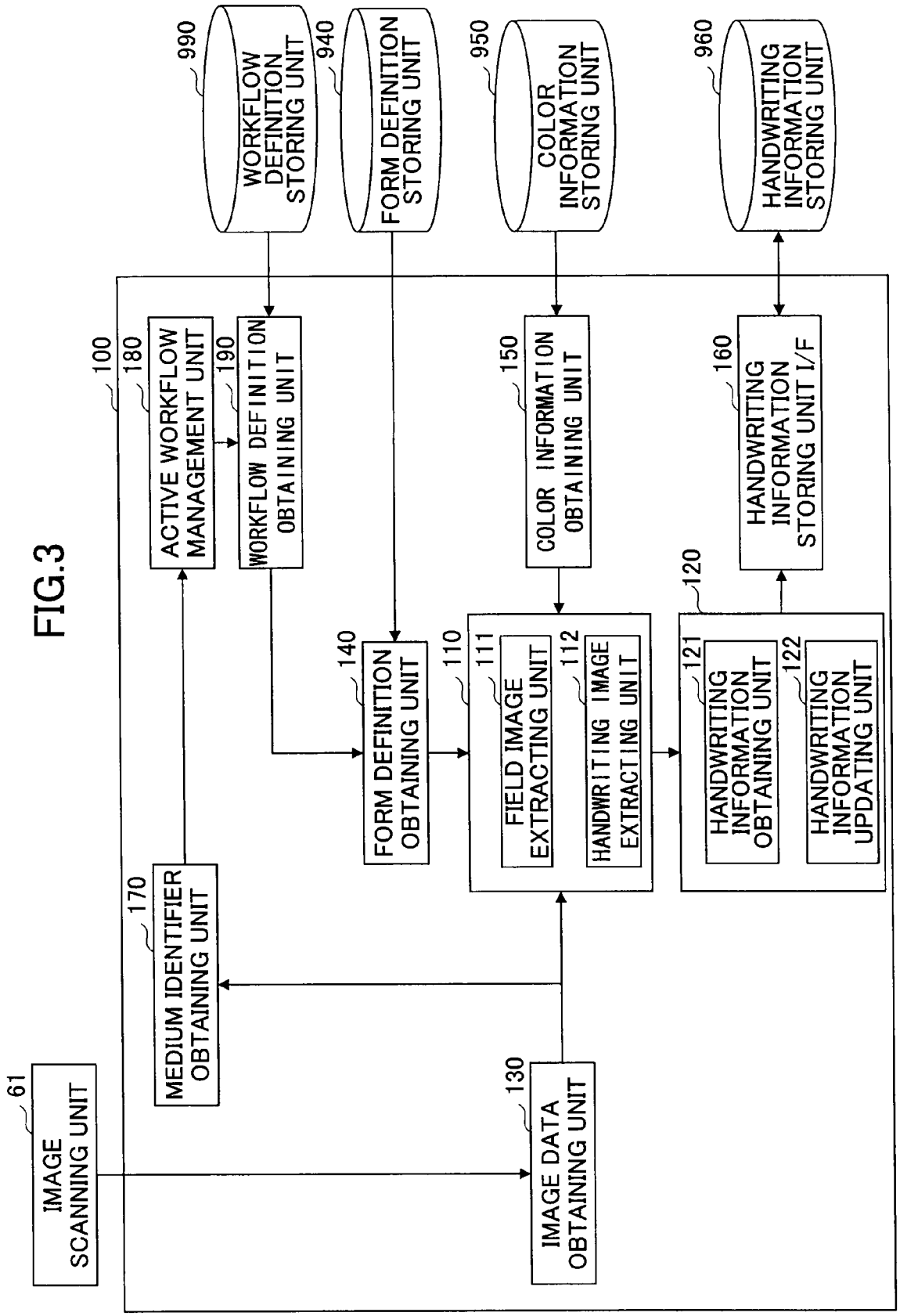
FIG. 3 is a block diagram illustrating a first exemplary functional configuration of an information processing apparatus.

FIG. 3 is a block diagram illustrating an exemplary functional configuration of an information processing apparatus 100 according to an embodiment of the present invention. The information processing apparatus 100 is configured to extract a current handwriting image written on a confirmation/correction form.

As shown in FIG. 3, the information processing apparatus 100 includes an image extracting unit 110, an image data obtaining unit 130, a form definition obtaining unit 140, and a workflow definition obtaining unit 190.

The information processing apparatus 100 may also include a handwriting image analysis unit 120, a color information obtaining unit 150, a handwriting information storing unit interface (I/F) 160, a medium identifier obtaining unit 170, and an active workflow management unit 180.

The image extracting unit 110 extracts field images of fields in a form from image data based on a form definition, and extracts handwriting images from the field images. The image extracting unit 110 includes a field image extracting unit 111 and a handwriting image extracting unit 112.

The field image extracting unit 111 extracts field images of fields in a form from image data based on a form definition. Specifically, the field image extracting unit 111 extracts field images of fields based on position coordinates of the fields defined in the form definition.

A form definition, for example, includes position coordinates (or positional information) of each field in a form and the type and format of information to be written in the field. For example, the type of information to be written in a character entry field of a form is "character", and the type of information to be written in a check box of a form is "symbol".

The handwriting image extracting unit 112 extracts current handwriting images from field images extracted by the field image extracting unit 111. A field image may include only a current handwriting image or include a previous handwriting image and a current handwriting image written to correct the previous handwriting image.

When a field image includes only a current handwriting image, the handwriting image extracting unit 112 extracts the current handwriting image. When a field image includes both a previous handwriting image and a current handwriting image, the handwriting image extracting unit 112 removes the previous handwriting image and extracts only the current handwriting image.

In this embodiment, a color (previous-image color) for drawing a previous handwriting image is defined as color information. The handwriting image extracting unit 112 extracts pixels with colors other than the previous-image color defined in the color information from a field image and thereby extracts a current handwriting image.

The color information is, for example, represented by a brightness or saturation level of the previous handwriting image and is retrieved from a color information storing unit 950 by the color information obtaining unit 150. Alternatively, the color information may be represented by a range of brightness or saturation levels. Also, the color information may be represented by a threshold of the brightness or saturation level.

The handwriting image analysis unit 120 analyzes each handwriting image extracted by the image extracting unit 110 and thereby obtains handwriting information from the handwriting image. For example, handwriting information may be codes of characters written in a character entry field of a form, or a code of a symbol written in a check box of a form. The handwriting image analysis unit 120 includes a handwriting information obtaining unit 121 and a handwriting information updating unit 122.

The handwriting information obtaining unit 121 obtains handwriting information of a handwriting image by performing an optical character recognition (OCR) process or an optical mark recognition (OMR) process on the handwriting image. For example, the handwriting information obtaining unit 121 performs either the OCR process or the OMR process on a handwriting image depending on the information type (defined in the form definition) of the field from which the handwriting image is obtained. The handwriting information updating unit 122 sends the handwriting information obtained by the handwriting information obtaining unit 121 via the handwriting information storing unit I/F 160 to a handwriting information storing unit 960 and thereby updates handwriting information stored in the handwriting information storing unit 960.

The image data obtaining unit 130 obtains image data from an image scanning unit 61 connected to the information processing apparatus 100. The image scanning unit 61 obtains the image data by scanning a confirmation/correction form on which additional information is handwritten by the user.

The form definition obtaining unit 140 retrieves a form definition of a form corresponding to the obtained image data. For example, the form definition obtaining unit 140 extracts a form identifier represented, for example, by a code from image data obtained by the image data obtaining unit 130, and retrieves the form definition of a form (confirmation/correction form) corresponding to the form identifier from a form definition storing unit 940. Alternatively, the form definition obtaining unit 140 may be configured to obtain a form definition based on a workflow definition obtained by the workflow definition obtaining unit 190.

The color information obtaining unit 150 retrieves color information of previous handwriting images from the color information storing unit 950. The handwriting information storing unit I/F 160 is an interface for writing data into or reading data from the handwriting information storing unit 960.

The medium identifier obtaining unit 170 obtains a medium identifier identifying a recording medium on which a form corresponding to a workflow step of an active workflow is printed. The medium identifier is, for example, represented by a machine-readable code, such as a bar code or a QR code, formed on a recording medium. The medium identifier obtaining unit 170 extracts an image representing a medium identifier from image data obtained by the image data obtaining unit 130, and obtains the medium identifier from the image. When the image represents a machine-readable code, the medium identifier obtaining unit 170 obtains the medium identifier by decoding the machine-readable code. When the image represents characters or symbols, the medium identifier obtaining unit 170 obtains the medium identifier by performing an OCR process on the image.

The active workflow management unit 180 manages the mapping between workflow identifiers of active workflows, step identifiers of workflow steps in the workflows, and medium identifiers of recording media on which forms corresponding to the workflow steps are printed.

The workflow definition obtaining unit 190 obtains a workflow definition of a workflow that includes a workflow step corresponding to the medium identifier from a workflow definition storing unit 990.

The image scanning unit 61 is, for example, a scanner that obtains image data by optically scanning a confirmation/correction form on which additional information is handwritten by the user. Although the image scanning unit 61 is provided as an external device in FIG. 3, it may be incorporated in the information processing apparatus 100.

The handwriting information storing unit 960 stores handwriting images and/or handwriting information obtained by the information processing apparatus 100. In the handwriting information storing unit 960, handwriting images and/or handwriting information is associated with the corresponding fields of the corresponding forms.

The color information storing unit 950 stores color information defining a previous-image color used for previous handwriting images (or confirmation information) that are to be removed by the image extracting unit 110. The color information is, for example, represented by a brightness or saturation level of the previous handwriting image. Alternatively, the color information may be represented by a range of brightness or saturation levels. Also, the color information may be represented by a threshold of the brightness or saturation level.

The form definition storing unit 940 stores form definitions of forms. A form definition, for example, includes positional information (coordinates) of each field in a form and the type and format of information to be written in the field. A form definition may also include a form identifier for identifying the form.

The form definition storing unit 940, the color information storing unit 950, and the handwriting information storing unit 960 may be integrated as one storing unit. Also, these storing units may be incorporated in the information processing apparatus 100.

<Second Exemplary Configuration of Information Processing Apparatus>

Figure 4:
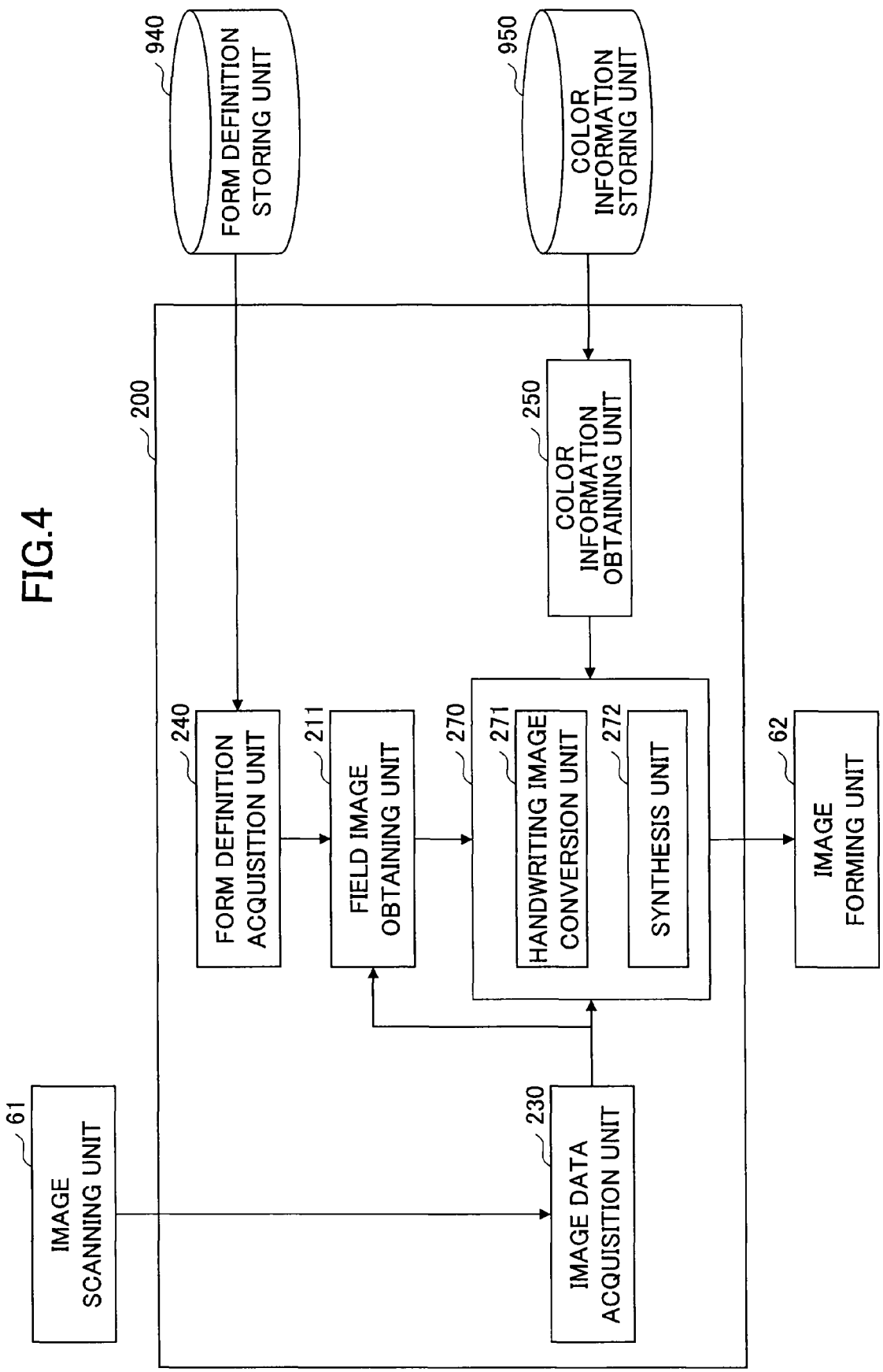
FIG. 4 is a block diagram illustrating a second exemplary functional configuration of an information processing apparatus.

FIG. 4 is a block diagram illustrating a functional configuration of an information processing apparatus 200 according to an embodiment of the present invention. The information processing apparatus 200 is configured to generate (print data of) a confirmation/correction form. As shown in FIG. 4, the information processing unit 200 is connected to the image scanning unit 61, an image forming unit 62, the form definition storing unit 940, and the color information storing unit 950. In FIG. 4, the same reference numbers are used for units corresponding to those shown in FIG. 3, and descriptions of those units are omitted.

The information processing apparatus 200 includes a field image obtaining unit 211 and a print data generating unit 270. The information processing apparatus 200 also includes an image data acquisition unit 230, a form definition acquisition unit 240, and a color information obtaining unit 250. The image data acquisition unit 230 obtains image data (or form data) from the image scanning unit 61. The image scanning unit 61 obtains the image data (or form data) by scanning a form in a field(s) of which information is handwritten by the user.

The field image obtaining unit 211, the image data acquisition unit 230, the form definition acquisition unit 240, and the color information obtaining unit 250, respectively, have substantially the same functions as the field image extracting unit 111, the image data obtaining unit 130, the form definition obtaining unit 140, and the color information obtaining unit 150 of the information processing apparatus 100 shown in FIG. 3. Therefore, descriptions of the units 211, 230, 240, and 250 are omitted here.

The print data generating unit 270 generates print data of a confirmation/correction form. The print data generating unit 270 includes a handwriting image conversion unit 271 and a synthesis unit 272.

The handwriting image conversion unit 271 extracts a handwriting image from each field image extracted by the field image obtaining unit 211, and converts the extracted handwriting image. Specifically, the handwriting image conversion unit 271 changes the color of the extracted handwriting image to a previous-image color defined in color information obtained by the color information obtaining unit 250 from the color information storing unit 950.

The synthesis unit 272 replaces the original handwriting image in the field image in the image data with the converted handwriting image, and thereby generates image data (or print data) of a confirmation/correction form.

The image forming unit 62 prints the image data generated by the print data generating unit 270 on a recording medium.

<Third Exemplary Configuration of Information Processing Apparatus>

Figure 5:
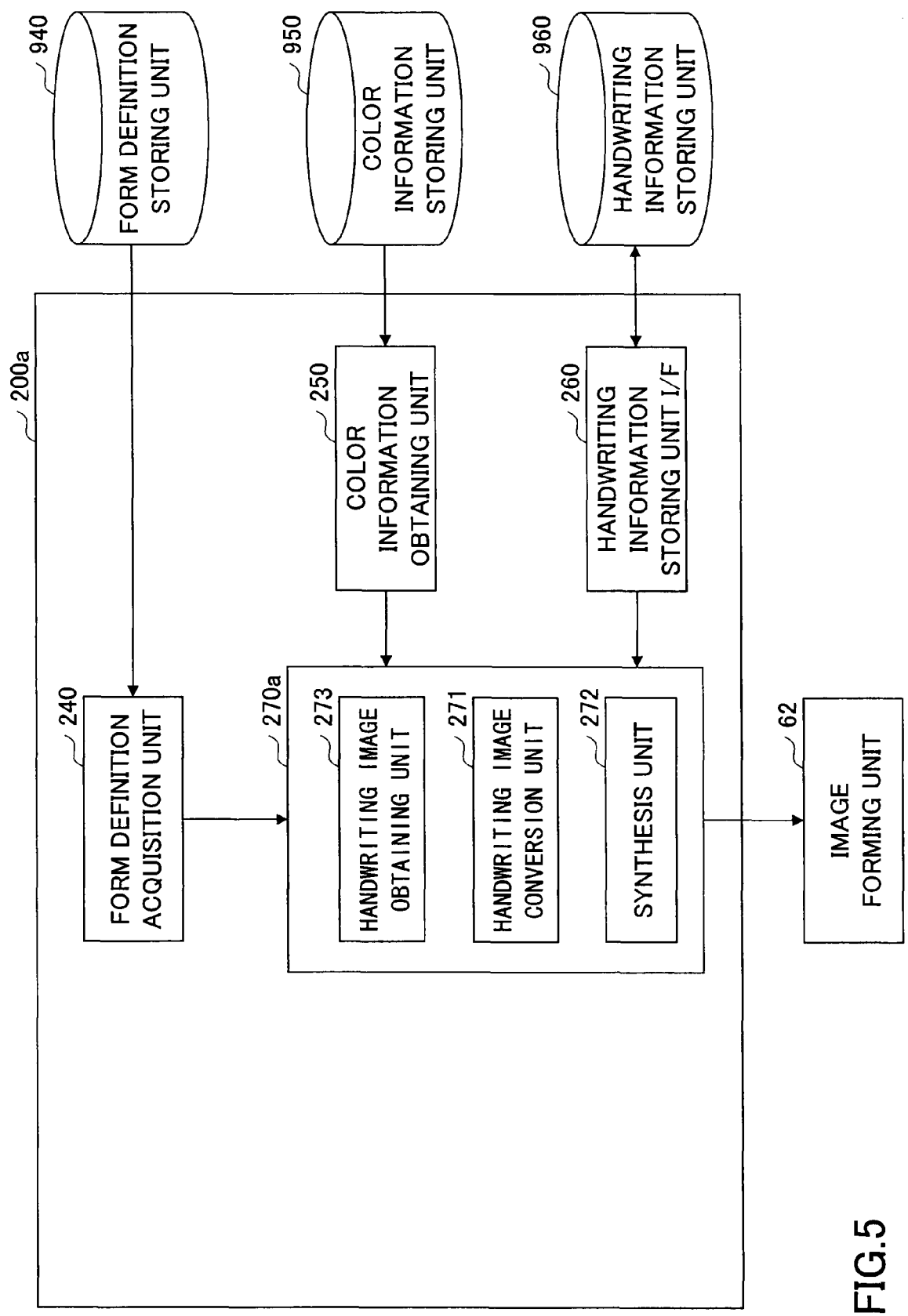
FIG. 5 is a block diagram illustrating a third exemplary functional configuration of an information processing apparatus.

FIG. 5 is a block diagram illustrating an exemplary functional configuration of an information processing apparatus 200a according to an embodiment of the present invention. The information processing apparatus 200a is configured to generate (print data of) a confirmation/correction form. As shown in FIG. 5, the information processing unit 200a is connected to the image forming unit 62, the form definition storing unit 940, the color information storing unit 950, and the handwriting information storing unit 960. In FIG. 5, the same reference numbers are used for units corresponding to those shown in FIGS. 3 and 4, and descriptions of those units are omitted.

The information processing apparatus 200a includes the form definition acquisition unit 240, the color information obtaining unit 250, a handwriting information storing unit I/F 260, and a print data generating unit 270a.

The print data generating unit 270a includes the handwriting image conversion unit 271, the synthesis unit 272, and a handwriting image obtaining unit 273. The handwriting image obtaining unit 273 retrieves handwriting images via the handwriting information storing unit I/F 260 from the handwriting information storing unit 960. If the handwriting information storing unit 960 stores handwriting images in the form of handwriting information, the handwriting image obtaining unit 273 retrieves the handwriting information, and generates handwriting images by, for example, rendering the handwriting information.

<Exemplary Configuration of Workflow System>

Figure 6:
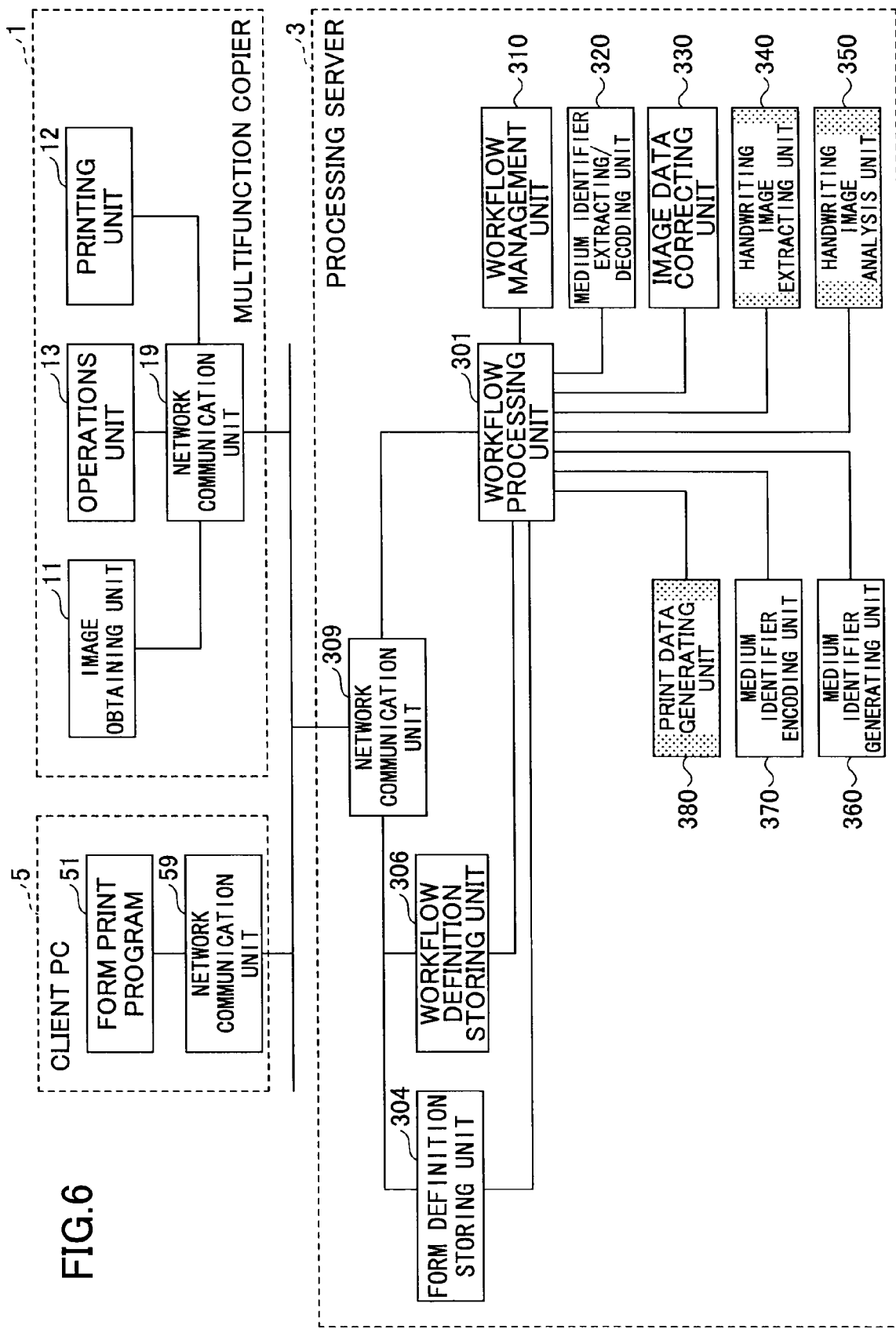
FIG. 6 is a drawing illustrating a workflow system including an information processing apparatus according to an embodiment of the present invention.

FIG. 6 is a drawing illustrating a workflow system including an information processing apparatus according to an embodiment of the present invention. The exemplary workflow system shown in FIG. 6 includes a multifunction copier 1, a processing server 3, and a client PC 5 that are connected to each other via a network.

An information processing apparatus of this embodiment is implemented as the processing server 3. Alternatively, an information processing apparatus of this embodiment may be implemented as a client terminal or a multifunction copier.

The processing server 3 includes a workflow processing unit 301, a form definition storing unit 304, a workflow definition storing unit 306, and a network communication unit 309.

The form definition storing unit 304 stores form definitions of forms. The workflow definition storing unit 306 stores workflow definitions of workflows. A workflow definition includes, for example, workflow steps to be performed in the workflow, (form identifiers of) forms corresponding to the workflow steps, users and departments involved in the workflow, and a workflow identifier of the workflow.

The workflow processing unit 301 includes a workflow management unit 310, a medium identifier extracting/decoding unit 320, an image data correcting unit 330, a handwriting image extracting unit 340, a handwriting image analysis unit 350, a medium identifier generating unit 360, a medium identifier encoding unit 370, and a print data generating unit 380.

The workflow management unit 310 manages, for each active workflow, information on the person in charge of the workflow and workflow steps to be performed in the workflow.

The medium identifier extracting/decoding unit 320 extracts a medium identifier for identifying a recording medium (e.g., a paper sheet) from image data and decodes the medium identifier if necessary. The image data correcting unit 330 corrects, for example, colors and distortion of image data in order to improve the accuracy of extracting a handwriting image by the handwriting image extracting unit 340.

The handwriting image extracting unit 340 extracts handwriting images from fields in image data. The handwriting image analysis unit 350 analyzes the handwriting images extracted by the handwriting image extracting unit 340 and thereby obtains handwriting information of the handwriting images.

The medium identifier generating unit 360 generates a medium identifier for each recording medium (e.g., a paper sheet) on which a confirmation/correction form is printed. The medium identifier encoding unit 370 encodes the medium identifier generated by the medium identifier generating unit 360, for example, into a QR code. The print data generating unit 380 generates print data of a confirmation/correction form.

The client PC 5 includes a form print program 51 and a network communication unit 59. The form print program 51 obtains a list of workflow definitions via the network communication unit 59 from the processing server 3, prompts the user to select a workflow from the list, and sends a print request to print a form used in the first workflow step of the selected workflow. Alternatively, the form print program 51 may be configured to send a print request to print a form used in a specified workflow step of an active workflow.

The multifunction copier 1 includes an image obtaining unit 11, a printing unit 12, an operations unit 13, and a network communication unit 19. The image obtaining unit 11 scans a form according to a user request and thereby obtains image data of the form. The printing unit 13 prints a form according to a user request. The operations unit 13 is a user interface for entering commands to the multifunction copier 1 and for displaying statuses of the multifunction copier 1 and the processing server 3. The network communication unit 19 communicates with other devices on the network.

An exemplary process in the workflow system shown in FIG. 6 is described below.

The network communication unit 309 of the processing server 3 receives image data from the multifunction copier 1. The medium identifier extracting/decoding unit 320 extracts an encoded medium identifier from the image data and decodes the encoded medium identifier.

The workflow management unit 310 retrieves a workflow definition and a form definition based on the decoded medium identifier, respectively, from the workflow definition storing unit 306 and the form definition storing unit 304. Then, from the form definition, the workflow management unit 310 obtains positional information of entry fields in the confirmation/correction form, attributes and processing methods of the entry fields, and correction methods and parameters for correcting the image data.

The image data correcting unit 330 corrects the image data according to the correction methods and parameters. The handwriting image extracting unit 340 extracts field images of the entry fields from the corrected image data based on the positional information of the entry fields. The handwriting image analysis unit 350 processes (e.g., performs the OCR or OMR process on) the field images according to the attributes and processing methods of the entry fields, and thereby obtains handwriting information from the field images (or from handwriting images in the field images).

The print data generating unit 380 generates a confirmation/correction form by combining the handwriting information, a form image of a form used in the next workflow step of the workflow, and a medium identifier generated by the medium identifier generating unit 360 and encoded by the medium identifier encoding unit 370. The generated confirmation/correction form is sent by the network communication unit 309 to the multifunction copier 1 and is printed by the multifunction copier 1.

<Confirmation/Correction Process>

Figure 7:
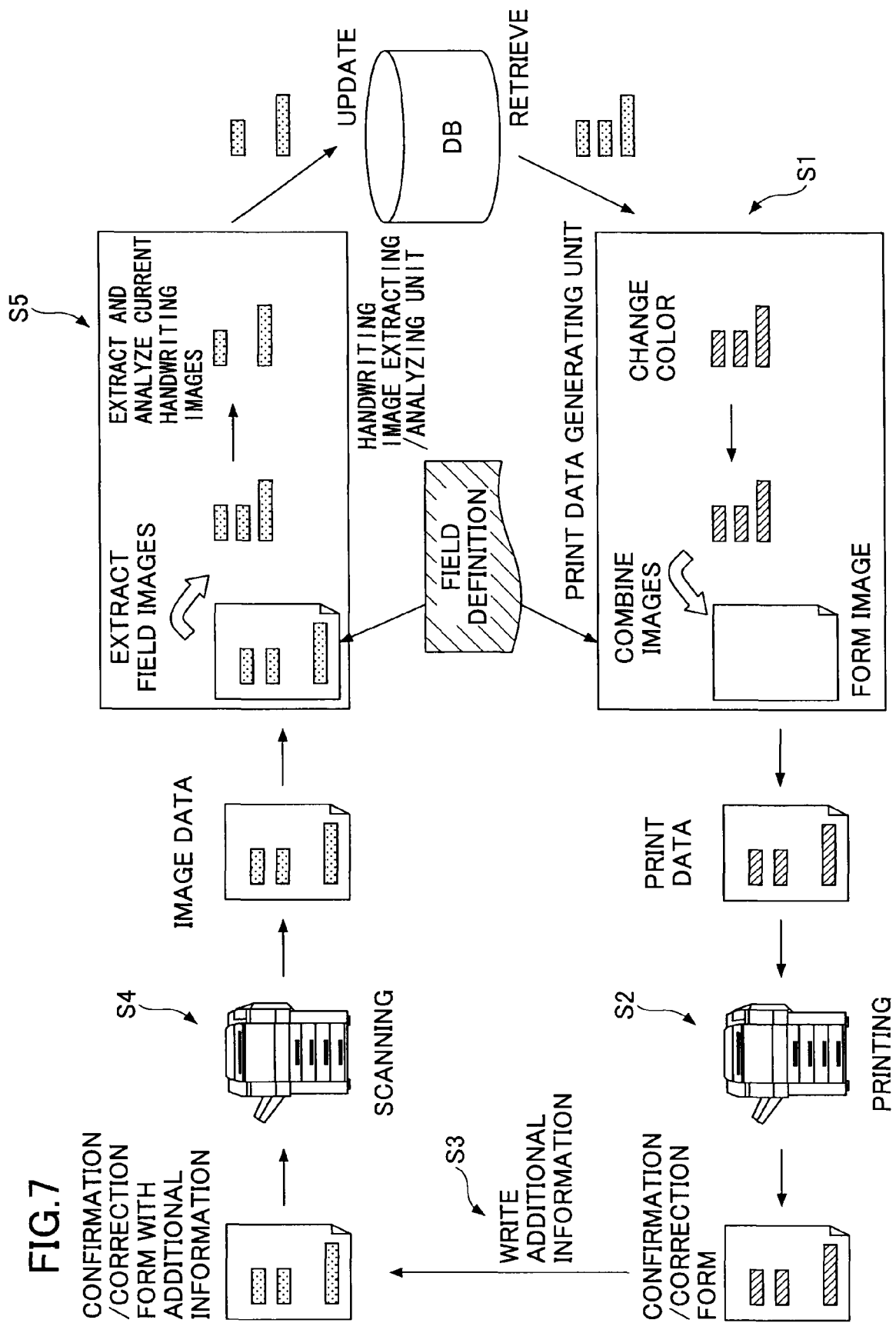
FIG. 7 is a drawing illustrating an exemplary confirmation/correction process according to an embodiment of the present invention.

FIG. 7 is a drawing illustrating an exemplary confirmation/correction process according to an embodiment of the present invention. In the process shown in FIG. 7, it is assumed that handwriting information has already been obtained and stored in a database by the workflow system shown in FIG. 6.

In step S1 of FIG. 7, the print data generating unit 380 retrieves handwriting information from the database and generates print data of a confirmation/correction form based on the retrieved handwriting information.

More specifically, the print data generating unit 380 generates handwriting images from the retrieved handwriting information and changes the color of the handwriting images to a predetermined color (previous-image color) used for previous handwriting images. Then, the print data generating unit 380 combines the handwriting images and a form image (used as the background of a confirmation/correction form) of a form based on field definition information (or a form definition) to generate print data.

In step S2, the generated print data of the confirmation/correction form is printed by the multifunction copier 1.

In step S3, the user writes additional information on the printed confirmation/correction form. In step S4, the user scans the confirmation/correction form on which the additional information is written by using the multifunction copier 1 to obtain its image data.

In step S5, the handwriting image extracting unit 340 determines whether there is a current handwriting image (correction information) written over a previous handwriting image (confirmation information) in the image data. If there is a current handwriting image, the handwriting image analysis unit 350 obtains handwriting information from the current handwriting image and replaces previous handwriting information in the database with the obtained handwriting information.

More specifically, the handwriting image extracting unit 340 extracts field images from the image data obtained in step S4 based on the form definition defining the positions and sizes of fields in the confirmation/correction form. If a field image contains a current handwriting image written over a previous handwriting image that is represented in the previous-image color, the handwriting image extracting unit 340 removes the previous handwriting image and obtains the current handwriting image.

Since the previous handwriting image (or confirmation information) is composed of pixels with the previous-image color, the handwriting image extracting unit 340 can remove the previous handwriting image by extracting only pixels with colors other than the previous-image color.

The handwriting image analysis unit 350 analyzes (e.g., performs the OCR or OMR process on) the current handwriting image to obtain its handwriting information. Then, the handwriting image analysis unit 350 updates corresponding handwriting information stored in the database with the handwriting information of the current handwriting image. If a field image does not contain a current handwriting image or contains only a previous handwriting image, the handwriting information of the previous handwriting image stored in the database is retained without change. The database in the above process may contain handwriting images instead of handwriting information or both of them.

Thus, embodiments of the present invention enable the user to confirm already registered information with a confirmation/correction form and, if necessary, to correct or update the registered information by writing correction information by hand on the confirmation/correction form. In other words, embodiments of the present invention make it possible to easily correct electronic information obtained from handwritten information without using a dedicated input device such as an electronic pen. Also, embodiments of the present invention eliminate the need to provide extra space for writing correction information in a form and thereby improve the flexibility in form design.

<Configurations of Handwriting Image Extracting Unit and Handwriting Image Analysis Unit>

Figure 8:
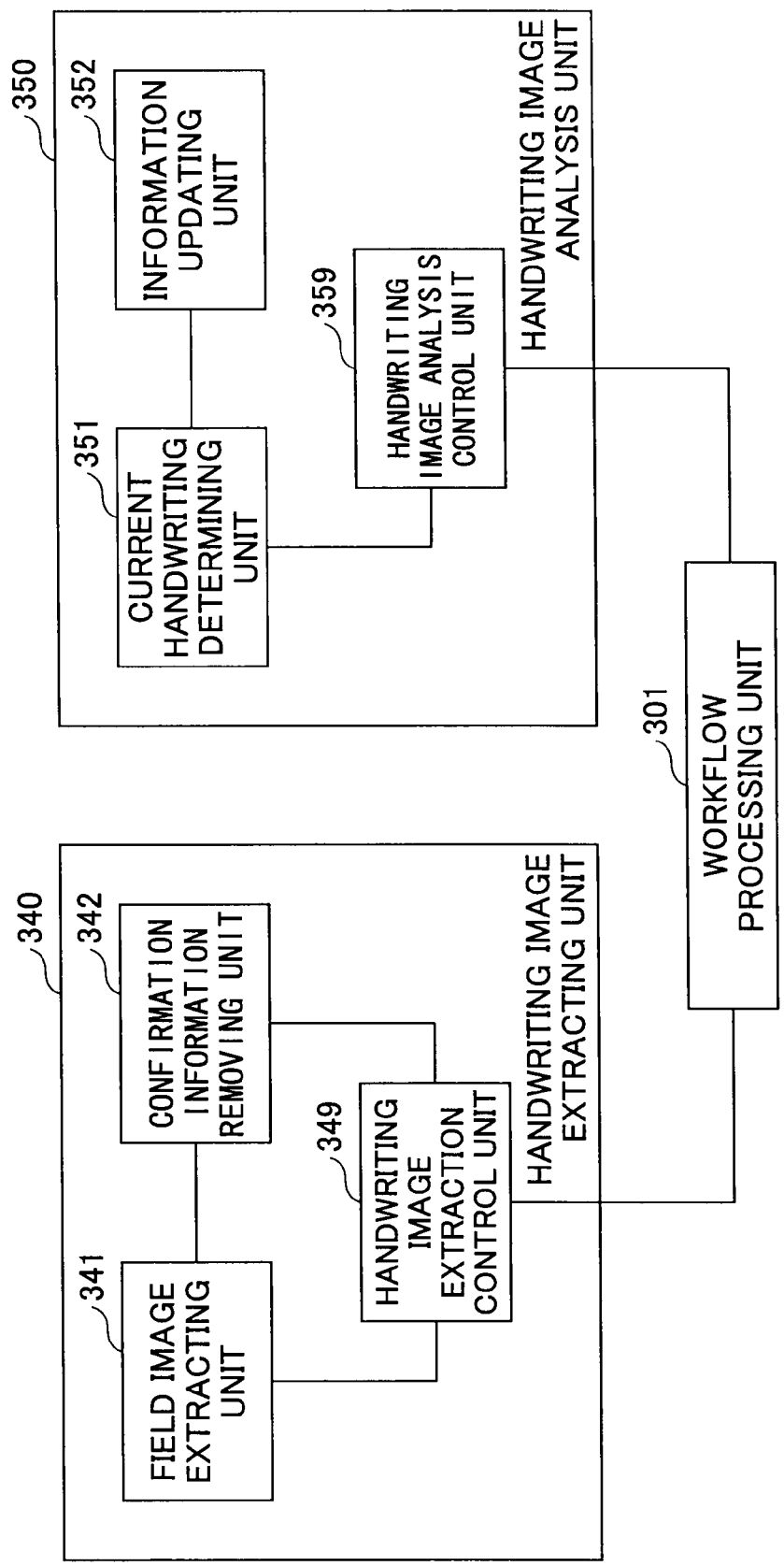
FIG. 8 is a block diagram illustrating configurations of a handwriting image extracting unit and a handwriting image analysis unit.

FIG. 8 is a block diagram illustrating exemplary configurations of the handwriting image extracting unit 340 and the handwriting image analysis unit 350. The handwriting image extracting unit 340 and the handwriting image analysis unit 350 may be integrated as a handwriting image extracting/analyzing unit. The handwriting image extracting unit 340 and the handwriting image analysis unit 350 are controlled by the workflow processing unit 301.

As shown in FIG. 8, the handwriting image extracting unit 340 includes a field image extracting unit 341, a confirmation information removing unit 342, and a handwriting image extraction control unit 349.

The handwriting image extraction control unit 349 controls other units in the handwriting image extracting unit 340. Also, the handwriting image extraction control unit 349 receives image data obtained by scanning a confirmation/correction form and its form definition from the workflow processing unit 301, and sends them to the field image extracting unit 341. Further, the handwriting image extraction control unit 349 receives processed image data from the confirmation information removing unit 342 and sends the image data to the workflow processing unit 301.

The field image extracting unit 341 extracts field images from the image data sent from the handwriting image extraction control unit 349 based on the form definition, and sends the field images to the confirmation information removing unit 342.

The confirmation information removing unit 342 removes confirmation information (a previous handwriting image) from each of the field images sent from the field image extracting unit 341. Confirmation information is composed of pixels with a predetermined color (previous-image color). The confirmation information removing unit 342 removes confirmation information, for example, by changing the color of the pixels to a background color. More specifically, the confirmation information removing unit 342 checks the brightness or saturation level in an RGB color space of each pixel, and changes the color of the pixel to a background color if the brightness or saturation level of the pixel is larger than a predetermined threshold. Alternatively, the confirmation information removing unit 342 may be configured to exclude pixels with the previous-image color from a current handwriting image to be extracted.

After removing confirmation information from the field images, the confirmation information removing unit 342 sends the field images to the handwriting image extraction control unit 349.

The handwriting image analysis unit 350 includes a current handwriting determining unit 351, an information updating unit 352, and a handwriting image analysis control unit 359.

The handwriting image analysis control unit 359 receives the field images (not including confirmation information) extracted by the handwriting image extracting unit 340 from the workflow processing unit 301, and sends the field images to the current handwriting determining unit 351.

The current handwriting determining unit 351 determines whether each of the field images sent from the handwriting image analysis control unit 359 contains a current handwriting image. If a field image does not contain a current handwriting image, the field image is composed of white or whitish pixels (i.e., pixels constituting the background). If a field image contains a current handwriting image, the field image includes pixels that are not white, i.e., pixels that constitute a current handwriting image. A color other than white may also be used as the background color of a form.

Alternatively, the current handwriting determining unit 351 may be configured to determine the presence of a current handwriting image based on the presence of pixels having values larger than a predetermined threshold. This configuration reduces the influence of noise in image data caused, for example, by a smudge on a form or a scanning unit. Also, the current handwriting determining unit 351 may be configured to determine the presence of a current handwriting image by the OCR or OMR process.

If a field image contains a current handwriting image, the current handwriting determining unit 351 performs the OCR or OMR process on the field image to obtain handwriting information of the current handwriting image, and sends the obtained handwriting information to the information updating unit 352. Alternatively, the current handwriting determining unit 351 may be configured to send the field image containing the current handwriting image as is to the information updating unit 352.

The information updating unit 352 receives the obtained handwriting information or field image from the current handwriting determining unit 351, and replaces the corresponding handwriting information or field image stored in a database with the received handwriting information or field image.

In FIG. 8, the workflow processing unit 301 sends image data obtained by scanning a confirmation/correction form and its form definition to the handwriting image extracting unit 340, receives field images extracted from the image data by the handwriting image extracting unit 340, and sends the field images to the handwriting image analysis unit 350.

<Configuration of Print Data Generating Unit>

Figure 9:
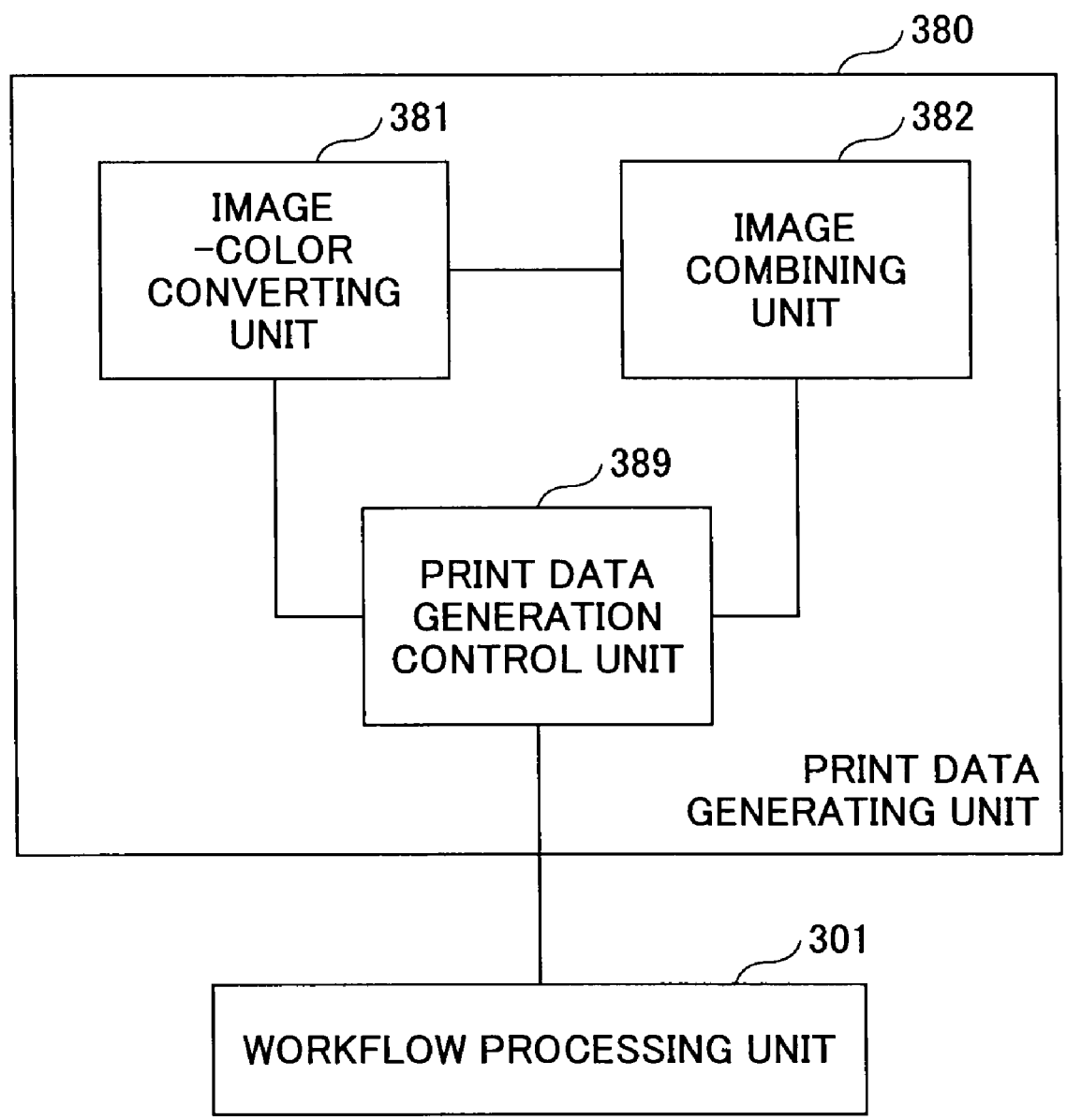
FIG. 9 is a drawing illustrating a configuration of a print data generating unit.

FIG. 9 is a drawing illustrating an exemplary configuration of the print data generating unit 380. As shown in FIG. 9, the print data generating unit 380 is connected to the workflow processing unit 301 and includes an image-color converting unit 381, an image combining unit 382, and a print data generation control unit 389.

The print data generation control unit 389 receives a print request to print a confirmation/correction form and information necessary to print the confirmation/correction form from the workflow processing unit 301. The information necessary to print a confirmation/correction form includes a form definition of the confirmation/correction form or a form image generated based on the form definition, and field images (containing handwriting images) to be embedded in the corresponding fields of the confirmation/correction form. Also, the print data generation control unit 389 sends generated print data of the confirmation/correction form to the workflow processing unit 301.

The image-color converting unit 381 identifies pixels other than white or whitish pixels (hereafter called white pixels) in each of the field images sent from the print data generation control unit 389, and changes the color(s) of the identified pixels to a predetermined previous-image color.

Changing the color(s) of the identified pixels to the previous-image color makes it possible for the confirmation information removing unit 342 of the handwriting image extracting unit 340 to remove those pixels (i.e., a previous handwriting image). The previous-image color is defined, for example, as a color having a saturation or brightness level that is larger than a predetermined threshold.

The image combining unit 382 combines the form image of the confirmation/correction form sent from the print data generation control unit 389 and the field images processed by the image-color converting unit 381 based on positional information of fields defined in the form definition, and thereby generates print data of the confirmation/correction form.

In FIG. 9, the workflow processing unit 301 sends a form image of a confirmation/correction form, field images to be embedded in the corresponding fields of the confirmation/correction form, and a form definition of the confirmation/correction form to the print data generation control unit 389, and receives generated print data from the print data generation control unit 389.

<Exemplary Process by Handwriting Image Extracting Unit and Handwriting Image Analysis Unit>

Figure 10:
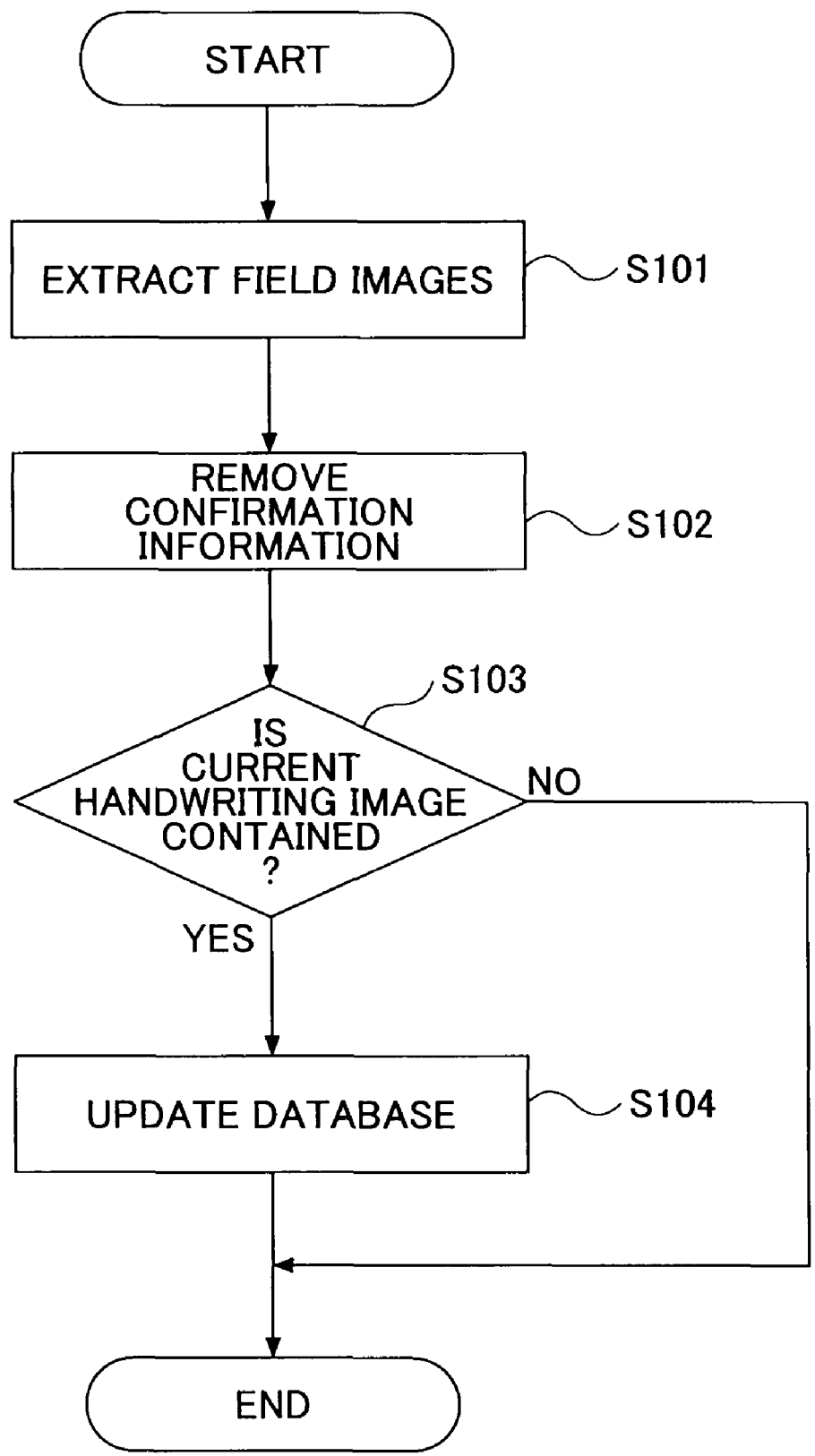
FIG. 10 is a flowchart showing an exemplary process performed by a handwriting image extracting unit and a handwriting image analysis unit.

FIG. 10 is a flowchart showing an exemplary process performed by the handwriting image extracting unit 340 and the handwriting image analysis unit 350. In this process, field images are extracted from image data obtained by scanning a confirmation/correction form on which additional information is handwritten by the user, current handwriting images in the extracted field images are identified, and handwriting information of the identified current handwriting images is obtained.

In step S101, the field image extracting unit 341 of the handwriting image extracting unit 340 extracts field images from image data obtained by scanning a confirmation/correction form on which additional information is handwritten by the user, based on positional information of fields defined in the form definition of the confirmation/correction form. In step S102, the confirmation information removing unit 342 removes confirmation information (previous handwriting images) from the extracted field images.

In step S103, the current handwriting determining unit 351 of the handwriting image analysis unit 350 determines whether the field images contain current handwriting images. If no current handwriting image is found, the process is terminated. If a current handwriting image is found in a field image, the current handwriting determining unit 351 performs the OCR or OMR process on the field image to obtain handwriting information of the current handwriting image, and sends the obtained handwriting information to the information updating unit 352. Then, the process goes to step S104. Alternatively, the current handwriting determining unit 351 may be configured to send the field image containing the current handwriting image as is to the information updating unit 352.

In step S104, the information updating unit 352 replaces the corresponding handwriting information or field image stored in a database with the obtained handwriting information or field image. Handwriting information or field images are preferably stored in the database in association with the corresponding fields and/or forms.

<Exemplary Process by Print Data Generating Unit>

Figure 11:
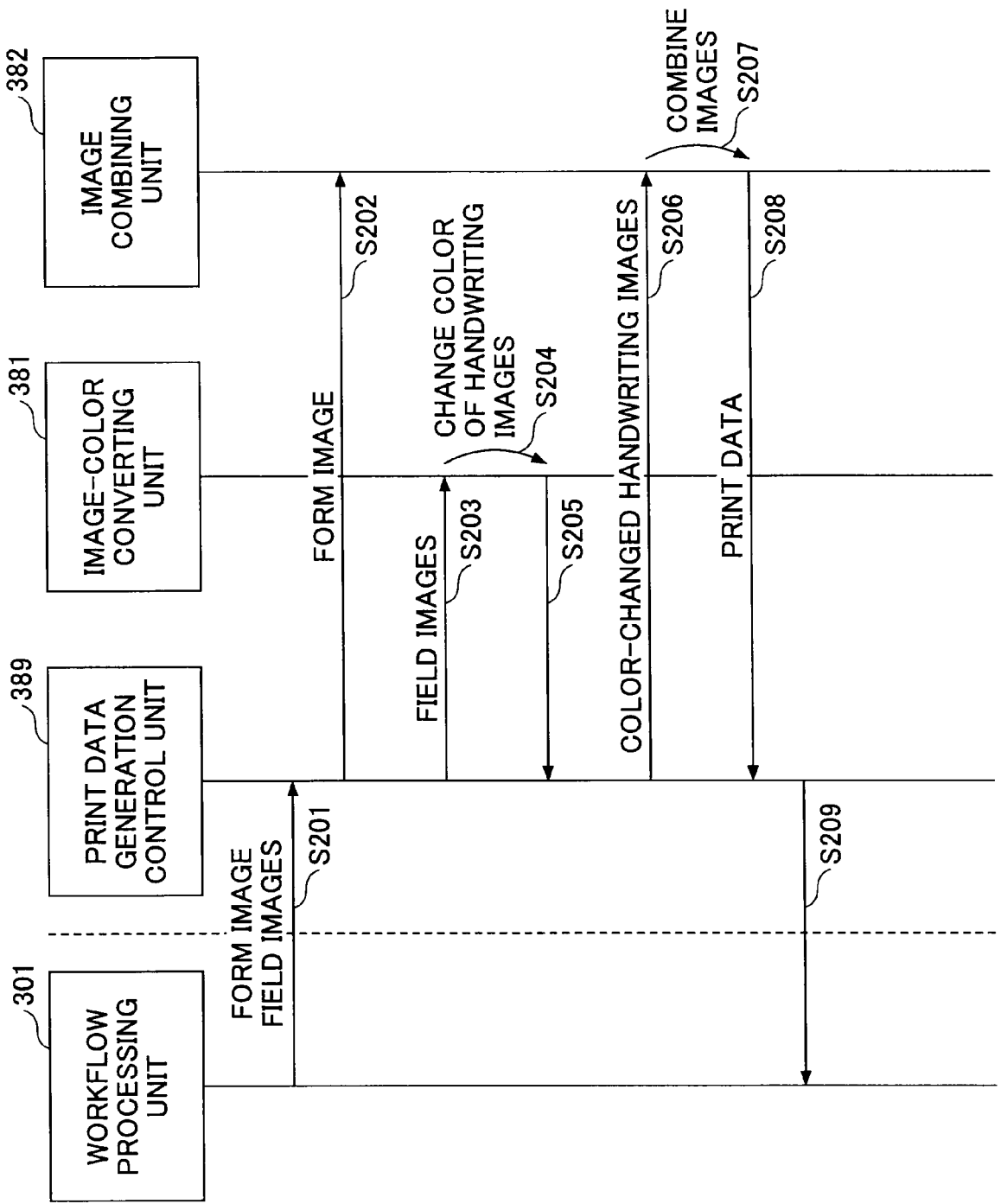
FIG. 11 is a sequence chart showing an exemplary process performed by a print data generating unit.

FIG. 11 is a sequence chart showing an exemplary process performed by the print data generating unit 380. In step S201, the workflow processing unit 301 sends a form image generated based on the form definition of a form used in a workflow step of an active workflow and field images to be embedded in the corresponding fields of the form, to the print data generation control unit 389.

Following step S201, steps S202 and S203 are performed. Steps S202 and S203 may be either performed concurrently or in sequence.

In step S202, the print data generation control unit 389 sends the form image to the image combining unit 382. In step S203, the print data generation control unit 389 sends the field images to the image-color converting unit 381.

In step S204, the image-color converting unit 381 changes the color(s) of pixels having specific pixel values (i.e., pixels constituting a handwriting image) in each of the field images to a previous-image color. Pixels having specific pixel values may be defined as those having colors other than the background color of the field images. The background color may be defined as pixel values that are larger or smaller than a predetermined threshold.

Also, pixels having specific pixel values may be defined as those having a color used for handwriting. The color used for handwriting may be defined as pixel values that are larger or smaller than a predetermined threshold. For example, the image-color converting unit 381 identifies pixels having pixel values smaller than a predetermined threshold as those constituting a handwriting image, and changes the colors of the identified pixels to the previous-image color.

In step S205, the image-color converting unit 381 sends the field images containing color-changed handwriting images together with a color-conversion completion report to the print data generation control unit 389.

In step S206, the print data generation control unit 389 sends the field images containing color-changed handwriting images to the image combining unit 382.

In step S207, the image combining unit 382 combines the form image received in step S202 and the field images received in step S206. Specifically, the image combining unit 382 embeds the field images in the corresponding fields on the form image based on the positional information of fields defined in the form definition, and thereby generates print data of a confirmation/correction form.

In step S208, the image combining unit 382 sends the generated print data of the confirmation/correction form to the print data generation control unit 389. In step S209, the print data generation control unit 389 sends the print data to the workflow processing unit 301. In steps S208 and S209, the print data may be sent together with a completion report.

<Configuration of Computer>

FIG. 12 is a block diagram illustrating a configuration of an exemplary computer for implementing an information processing apparatus according to an embodiment of the present invention. As shown in FIG. 12, the exemplary computer includes a main processing unit 400, an input unit 410, a display unit 420, a printer 430, a scanner 440, and a hard disk drive (HDD) 490. The main processing unit 400 controls other components of the exemplary computer and includes a CPU 401, a ROM 408, and a RAM 409. The CPU 401 reads program code from the ROM 408, loads the program code into the RAM 409, and executes the loaded program code. The ROM 408 is a non-volatile memory and stores program code to be executed by the CPU 401 to perform an information processing method according to an embodiment of the present invention. The ROM 408 also stores parameters used to control the computer. The RAM 409 is used as a working memory by the CPU 401 to perform various processes.

The input unit 410 is, for example, a keyboard used by the user to input commands. The display unit 420 displays, for example, statuses of the computer. The printer 430 forms an image on a recording medium. The scanner 440 optically scans an image formed on a recording medium. The HDD 490 stores large volumes of data such as image data.

Program code for causing the computer to implement an information processing method according to an embodiment of the present invention may also be stored in the HDD 490 or a storage medium that is mountable on a storage medium drive.

As described above, embodiments of the present invention provide an information processing apparatus and an information processing method that make it possible to easily confirm and correct electronic information obtained from handwritten information without using a dedicated input device such as an electronic pen and without sacrificing the flexibility in form design.

The present invention is not limited to the specifically disclosed embodiments, and variations and modifications may be made without departing from the scope of the present invention.

The present application is based on Japanese Priority Application No. 2007-137222, filed on May 23, 2007, the entire contents of which are hereby incorporated herein by reference.

What is claimed is:

1. An information processing apparatus, comprising:
   an image data obtaining unit configured to obtain image data generated by scanning a confirmation/correction form on a recording medium;
   a workflow definition obtaining unit configured to obtain a workflow definition of a workflow that includes a workflow step corresponding to the recording medium;
   a form definition obtaining unit configured to obtain a form definition of the confirmation/correction form corresponding to the workflow step based on the workflow definition;
   a field image extracting unit configured to extract a field image of a field of the confirmation/correction form from the image data based on the form definition;
   a handwriting image extracting unit configured to remove a previous handwriting image and extract a current handwriting image from the field image if the field image contains both the previous handwriting image and the current handwriting image, and to extract the current handwriting image from the field image if the field image contains only the current handwriting image; and
   a color information obtaining unit configured to obtain color information indicating a brightness or saturation level of the previous handwriting image from a color information storing unit, wherein
   the handwriting image extracting unit is configured to remove the previous handwriting image from the field image based on the brightness or saturation level, and
   the current handwriting image corresponds to handwritten information that is written on the recording medium without an electronic pen.

2. The information processing apparatus as claimed in claim 1, further comprising:
   a workflow management unit configured to manage mapping between the recording medium and the workflow step; and
   a medium identifier obtaining unit configured to extract a medium identifier identifying the recording medium from the image data;
   wherein the workflow definition obtaining unit is configured to obtain the workflow definition of the workflow that includes the workflow step corresponding to the recording medium based on the medium identifier.

3. The information processing apparatus as claimed in claim 1, further comprising:

a handwriting information obtaining unit configured to obtain handwriting information from the current handwriting image extracted by the handwriting image extracting unit by performing an OMR process or an OCR process on the current handwriting image according to an information type of the field of the confirmation/correction form containing the current handwriting image which information type is defined in the form definition.

4. The information processing apparatus as claimed in claim 3, further comprising:
   a handwriting information storing unit I/F; and
   a handwriting information updating unit configured to send the handwriting information via the handwriting information storing unit I/F to a handwriting information storing unit where previous handwriting information is stored in association with the field of the confirmation/correction form from which the previous handwriting information is obtained, and thereby to replace the previous handwriting information of the corresponding field of the confirmation/correction form with the handwriting information obtained by the handwriting information obtaining unit.

5. The information processing apparatus as claimed in claim 1, wherein
   the color information indicates a threshold of the brightness or saturation level of the previous handwriting image; and
   the handwriting image extracting unit is configured to remove the previous handwriting image from the field image based on the threshold.

6. An information processing method, comprising the steps of:
   a) obtaining image data generated by scanning a confirmation/correction form on a recording medium;
   b) obtaining a workflow definition of a workflow that includes a workflow step corresponding to the recording medium;
   c) obtaining a form definition of the confirmation/correction form corresponding to the workflow step based on the workflow definition;
   d) extracting a field image of a field of the confirmation/correction form from the image data based on the form definition;
   e) removing a previous handwriting image and extracting a current handwriting image from the field image if the field image contains both the previous handwriting image and the current handwriting image, or extracting the current handwriting image from the field image if the field image contains only the current handwriting image, the current handwriting image corresponding to handwritten information that is written on the recording medium without an electronic pen; and
   f) obtaining color information indicating a brightness or saturation level of the previous handwriting image, wherein
   in step e), the previous handwriting image is removed from the field image based on the brightness or saturation level.

7. The information processing method as claimed in claim 6, further comprising the step of:
   g) extracting a medium identifier identifying the recording medium from the image data;
   wherein, in step b), the workflow definition of the workflow that includes the workflow step corresponding to the recording medium is obtained based on the medium identifier.

8. The information processing method as claimed in claim 6, further comprising the step of:
   g) obtaining handwriting information from the current handwriting image extracted in step e) by performing an OMR process or an OCR process on the current handwriting image according to an information type of the field of the confirmation/correction form containing the current handwriting image which information type is defined in the form definition.

9. The information processing method as claimed in claim 8, further comprising the step of:
   h) replacing previous handwriting information, which is stored in a handwriting information storing unit, of the corresponding field of the confirmation/correction form with the handwriting information obtained in step g).

10. The information processing method as claimed in claim 6, wherein
   the color information indicates a threshold of the brightness or saturation level of the previous handwriting image; and
   in step e), the previous handwriting image is removed from the field image based on the threshold.

* * * * *